Patented July 2, 1940

2,206,572

UNITED STATES PATENT OFFICE 2,206,572

PHOTOGRAPHIC TONING WITH FERRICYANIDES

Roy Horst Landis, Briarcliff Manor, N. Y., assignor to American Cyanamid Company, New York, N. Y., a corporation of Maine No Drawing. Application December 13, 1938, Serial No. 245,473

2 Claims. (Cl. 95—88)

This invention relates to processes of toning photographic material using ferricyanide solutions.

In the past, it has been practice to tone films, plates, and similar photographic material by means of ferricyanide baths producing various colors by precipitating heavy metal ferricyanides in the place occupied by the developed silver grains. A number of colors are thus obtained, for example, blue when iron is used, red-brown with uranium, and the like. In the past, potassium ferricyanide of relatively high purity, for example, 98% or purer, has been considered as the only useful form in which to employ the ferricyanide. These pure potassium ferricyanide crystals represent a relatively costly source of the ferricyanide ion but it has been considered in the past that materials of this high purity were necessary in order to form satisfactory colors in the toning of photographic material.

According to the present invention, I have found that when sodium ferricyanide is used in place of potassium, highly impure sodium ferricyanide can be employed without deleterious effect and in fact, the results with sodium ferricyanide even when highly impure present advantages. Not only is the evenness of color fully equal to that obtainable with pure potassium ferricyanide, but in the case of blues, the shade of the blue is more greenish which is of advantage where the toner is to be used in producing three color transparencies, for example, in colored motion pictures produced by the Technicolor process. The blue film is supposed to be a blue-green or cyan and reddish tones adversely affect the color balance of the final film.

Very impure sodium ferricyanide liquor can be used, such as that obtained by the chlorination of sodium ferrocyanide and which is contaminated with salt, sodium ferrocyanide, ferricyanide complexes, and the like. Even better results are obtained when the sodium ferrocyanide is chlorinated by a new process which produces a liquor containing large amounts of sodium chloride, smaller amounts of ferricyanide complexes but substantially free from ferrocyanide. Excellent results can also be obtained by the use of sodium ferricyanide crystals which are substantially free from sodium ferrocyanide but contaminated with salt, ferricyanide complexes, and the like.

I have not been able to determine why the impure sodium ferricyanide solutions give as good results as the pure potassium ferricyanide crystals and improved color in the case of blue toners and do not wish to limit my invention to any particular theory of operation. The invention will be described in detail in conjunction with the following specific examples.

Example 1

A toner was prepared according to the following formula:

| | |
|---|---:|
| Ammonium persulfate_____grams__ | 0.5 |
| Iron and ammonium sulfate_____do____ | 1.4 |
| Oxalic acid_____do____ | 3.0 |
| *Sodium ferricyanide liquor_____ | |
| _____ cubic centimeters__ | 4.65 |
| Ammonium alum _____grams__ | 5.0 |
| Hydrochloric acid, 10%_____ | |
| _____cubic centimeters__ | 1.0 |
| Water_____do____ | 1000.0 |

*This liquor was a crude liquor prepared by the chlorination of sodium ferrocyanide and having approximately the following composition as far as simple chemical compounds are concerned:

| | Per cent |
|---|---:|
| Liquid component (calculated as water)___ | 72.7 |
| Sodium ferricyanide_____ | 21.5 |
| Sodium ferrocyanide_____ | 1.1 |
| Sodium chloride_____ | 4.7 |

The liquor also contained ferricyanide complexes in undetermined quantity.

A lantern slide, a negative and a positive film were toned in the above solution and compared with the same picture on the same material toned in a toning bath of the same formula except that an equivalent amount of pure potassium ferricyanide crystals was substituted for the crude sodium ferricyanide liquor.

The toned photographic material from the two processes was indistinguishable as far as quality of toning was concerned; that is to say, evenness, gradation, detail, and the like, but the material toned with the sodium ferricyanide liquor showed a definitely stronger greenish cast in the blue than did the material toned with potassium ferricyanide crystals. The green tone of blue gave improved projection and its spectral characteristics were better suited for subtractive three color transparencies.

Example 2

A uranium toner was prepared using the same sodium ferricyanide liquor described in Example 1 and its formula was as follows:

| | |
|---|---|
| Uranium nitrate _____ grams__ | 2.50 |
| Potassium oxalate _____ do____ | 2.50 |
| Sodium ferricyanide liquor_____ cubic centimeters__ | 4.65 |
| Ammonium alum _____ grams__ | 6.0 |
| Hydrochloric acid, 10%_____ cubic centimeters__ | 5.0 |
| Water_____ do____ | 1000.0 |

A lantern slide and negative film were toned in this solution and the same pictures on the same material were toned in a bath in which the sodium ferricyanide liquor was substituted by an equivalent amount of pure potassium ferricyanide crystals. The materials were entirely indistinguishable and both baths produced finely toned pictures in various shades of brownish-red.

Example 3

A blue toning bath was prepared according to the formula of Example 1 except that instead of the crude sodium ferricyanide liquor an equivalent amount of sodium ferricyanide liquor obtained by the process of Barnes and Ham application above referred to was substituted. This liquor had the following composition:

| | |
|---|---|
| Sodium ferricyanide _____ g./100 cc__ | 34.6 |
| Sodium ferrocyanide _____ g./100 cc__ | 0.06 |
| Density at 23°_____ | 1.229 |
| pH_____ | 8.0 |

Film material toned in this bath gave the same greenish blue shades as obtained with the crude sodium ferricyanide liquor of Example 1. The quality was excellent and no difficulty was encountered in obtaining an evenly toned picture with well defined half tones.

Example 4

A uranium toner solution was prepared having the following formula:

| | |
|---|---|
| Uranium nitrate_____ grams__ | 2.5 |
| Potassium oxalate _____ do____ | 2.5 |
| *Sodium ferricyanide (crystals)____ do____ | 1.33 |
| Ammonium alum _____ do____ | 6.0 |

*The sodium ferricyanide crystals were substantially free from sodium ferrocyanide but contained salt, and some ferricyanide complexes. The amount of salt impurity was slightly less than is present in the sodium ferricyanide liquor described in Example 3.

The film was toned in this solution and showed excellent definition and a brown-red tone.

What I claim is:

1. A method of toning photographic material which comprises subjecting a developed silver photographic image to the action of a bath containing impure sodium ferricyanide contaminated with sodium chloride and ferricyanide complexes but substantially free from ferrocyanide, and a metallic salt capable of forming with the ferricyanide and the silver of the image a colored water-insoluble compound.

2. A method of toning photographic material blue which comprises subjecting a developed silver photographic image to the action of a bath containing impure sodium ferricyanide contaminated with sodium chloride and ferricyanide complexes but substantially free from ferrocyanide, and an iron salt capable of forming with the ferricyanide and the silver of the image a colored water-insoluble compound, the color tones of the toning material being greener than those obtained from similar baths using pure potassium ferricyanide.

ROY HORST LANDIS.